No. 852,639. PATENTED MAY 7, 1907.
W. A. TURBAYNE.
ELECTRICAL SYSTEM OF DISTRIBUTION.
APPLICATION FILED JULY 25, 1906.
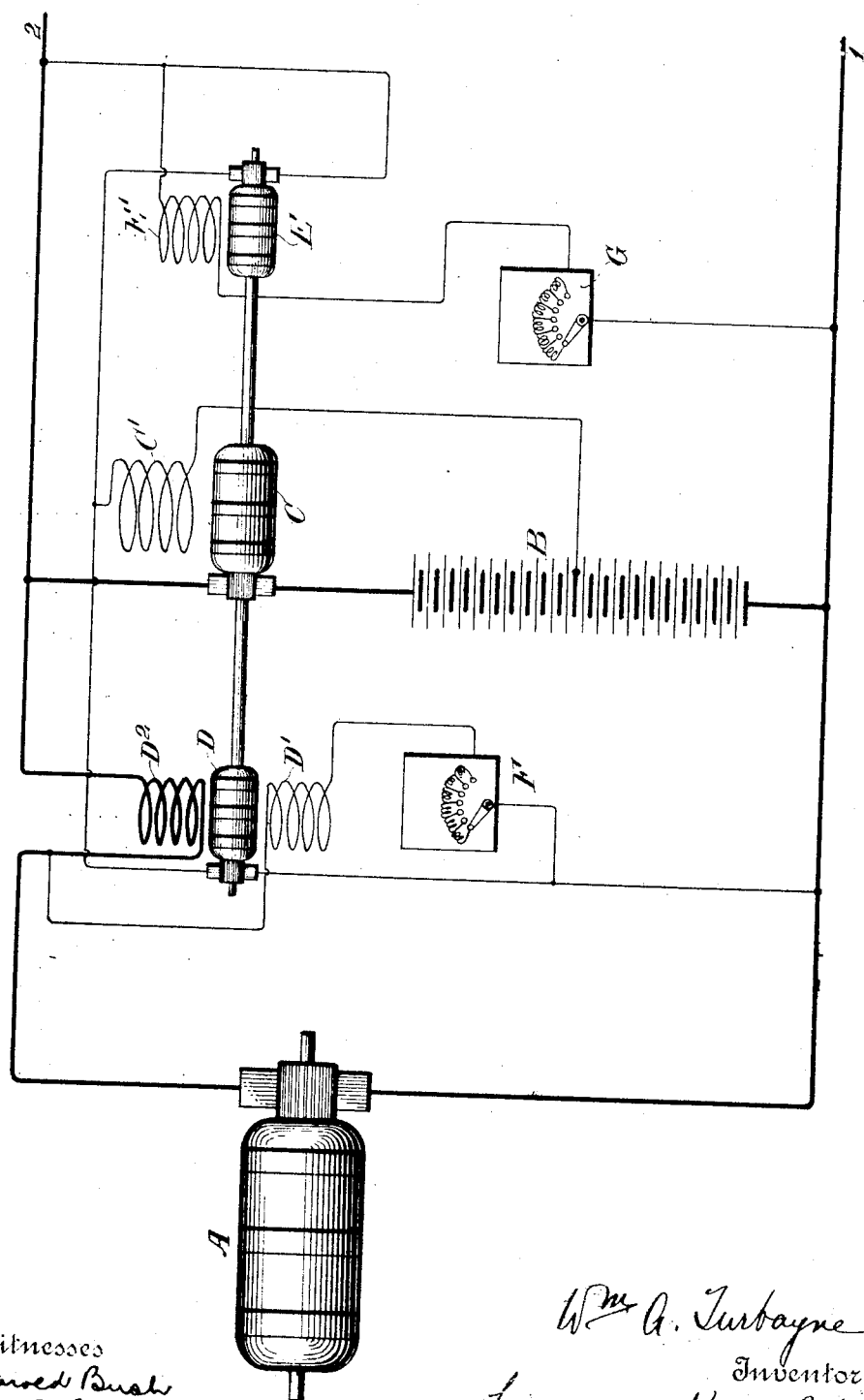

UNITED STATES PATENT OFFICE.

WILLIAM A. TURBAYNE, OF LANCASTER, NEW YORK, ASSIGNOR TO GOULD STORAGE BATTERY COMPANY, A CORPORATION OF NEW YORK.

ELECTRICAL SYSTEM OF DISTRIBUTION.

No. 852,639.

Specification of Letters Patent.

Patented May 7, 1907.

Application filed July 25, 1906. Serial No. 327,595.

*To all whom it may concern:*

Be it known that I, WILLIAM A. TURBAYNE, a citizen of the United States, and a resident of Lancaster, in the county of Erie, State of New York, have invented certain new and useful Improvements in Electrical Systems of Distribution, of which the following is a specification.

This invention relates to electrical systems of distribution and has been especially designed for systems employing a regulating battery to steady the current or voltage of a main generator although the invention in its broader aspects is not limited to this precise use.

My invention relates to the regulation of the action of the battery and includes the regulation thereof by relatively varying the electro-motive-forces produced by two electric motors connected in series with each other. In the present instance these two electric motors are employed to drive a booster in series with the battery and they regulate the battery action by regulating the field strength of said booster. When thus used these two motors may be substituted for the ordinary driving motor of the booster, thus permitting a regulation to be provided without the additional expensive regulating apparatus ordinarily provided. It is to be understood, however, that my invention is employed whether or not these two motors are thus used to drive the booster. I prefer to produce the relative variations of the electro-motive-forces or potential difference of these two motors by regulating the field strength of one of them by a field winding subjected to the current variations on the main generator.

The drawing accompanying this specification is a diagrammatic representation of one embodiment of my invention.

A is the main generator of any type constituting the source of supply.

B is the regulating battery and C is the armature of a booster in series with the battery.

C' is the regulating battery for the booster, which, in the present instance, is indicated as the field winding thereof.

D and E represent the two motors which are connected in series with each other in a branch circuit. One end of this circuit, indicated at 1, is directly connected with one side of the battery. The other side of this circuit, indicated at 2, is directly connected to the outside terminal of the booster armature.

D' and E' represent field windings for the two motors which may be connected, as indicated, to receive a substantially constant current.

D² is a field winding for the motor D which, in the present instance, is connected directly in the circuit of the generator A so as to be responsive to changes of current therein.

F and G are merely rheostats for adjusting the field strengths of the two motors.

One end of the regulating coil C' is connected to the branch circuit between the two motors D and E, the other end of this coil is, in the present instance, connected to a central point in the battery B.

Assuming the system to be adjusted so that with a given current on the generator A the electro-motive-forces produced by D and E are equal, then with the connections as shown, the potential at one end of the coil C' will be equal to the potential at the other end thereof, so that no current will flow in the coil C'. The booster will give no voltage. If now the current on the generator A changes the current in the coil D² correspondingly changes and the electro-motive-force or potential difference of the motor D will change. This will cause a current to flow through the coil C' in one direction or another according to whether the change of current in D² was an increase or a decrease. The result is that the booster is given a voltage in one direction or another to charge or discharge the battery as may be needed.

Having thus described my invention, what I claim as new and desire to secure by Letters Patent is:—

1. The combination of a generator, a regulating battery therefor, a coil for controlling the battery action, two motors connected in series with each other, means for varying the relative electro-motive forces of said motors responsively to changes of electrical condition of the system, and means for varying the current in said coil in accordance with said relative electro-motive forces.

2. The combination of a generator, a regulating battery therefor, a battery booster, a controlling coil for said booster, two motors connected in series with each other, means for varying the relative electro-motive forces of said motors responsively to changes of electrical condition of the system, and means for varying the current in said coil in accordance with said relative electro-motive forces.

3. The combination of a generator, a regulating battery therefor, a coil for controlling the battery action, two motors connected in series with each other, means for varying the relative electro-motive forces of said motors responsively to changes of current strength of said generator, and means for varying the current in said coil in accordance with said relative electro-motive forces.

4. The combination of a generator, a regulating battery therefor, a battery booster, a controlling coil for said booster, two motors connected in series with each other, means for varying the relative electro-motive forces of said motors responsively to changes of current strength of said generator, and means for varying the current in said coil in accordance with said relative electro-motive forces.

5. The combination of a generator, a regulating battery therefor, a coil for controlling the battery action, two motors connected in series with each other across the system, means for varying the relative electro-motive forces of said motors responsively to changes of electrical condition of the system, and means for varying the current in said coil in accordance with said relative electro-motive forces.

6. The combination of a generator, a regulating battery therefor, a coil for controlling the battery action, two motors connected in series with each other, means for varying the relative electro-motive forces of said motors responsively to changes of electrical condition of the system, and connections from the terminals of said coil respectively to a point in the circuit between the motors and to the battery.

7. The combination of a generator, a regulating battery therefor, a battery booster, a controlling coil for said booster, two motors connected in series with each other, means for varying the relative electro-motive forces of said motors responsively to changes of electrical condition of the system, and connections from the terminals of said coil respectively to a point in the circuit between the motors and to the battery.

8. The combination of a generator, a regulating battery therefor, a battery booster, a controlling coil for said booster, two motors connected in series with each other across the battery and booster, means for varying the relative electro-motive forces of said motors responsively to changes of electrical condition of the system, and connections from the terminals of said coil respectively to a point in the circuit between the motors and to a point midway the battery terminals.

9. The combination of a generator, a regulating battery therefor, a battery booster, a controlling coil for said booster, two motors connected in series with each other across the battery and booster, means for varying the relative electro-motive forces of said motors responsively to changes of current strength of said generator, and connections from the terminals of said coil respectively to a point in the circuit between the motors and to a point midway the battery terminals.

10. The combination of a generator, a regulating battery therefor, a dynamo to be automatically regulated and acting to control the battery action, two motors electrically in series and mechanically connected to said dynamo, means for varying the relative electro-motive forces of said motors responsively to changes of electrical condition of the system, and means for varying the current in said coil in accordance with said relative electro-motive forces.

11. The combination of a generator, a regulating battery therefor, a dynamo to be automatically regulated and acting to control the battery action, two motors electrically in series and mechanically connected to said dynamo, means for varying the relative electro-motive forces of said motors responsively to changes of current strength of said generator, and means for varying the current in said coil in accordance with said relative electro-motive forces.

12. The combination of a generator, a regulating battery therefor, a dynamo to be automatically regulated and acting to control the battery action, two motors electrically in series across the system and mechanically connected to said dynamo, means for varying the relative electro-motive forces of said motors responsively to changes of electrical condition of the system, and means for varying the current in said coil in accordance with said relative electro-motive forces.

13. The combination of a generator, a regulating battery therefor, a dynamo to be automatically regulated and acting to control the battery action, two motors electrically in series and mechanically connected to said dynamo, means for varying the relative electro-motive forces of said motors responsively to changes of electrical condition of the system, and connections from the terminals of said coil respectively to a point in the circuit between the motors and to the battery.

14. The combination of a generator, a regulating battery therefor, a battery booster, a field winding for controlling said booster, two motors connected in series with each other, means for varying the relative electro-motive forces of said motors responsively to changes of electrical condition of the system, and means for varying the current in said field winding in accordance with said relative electro-motive forces.

15. The combination of a generator, a regulating battery therefor, a battery booster, a field winding for controlling said booster, two motors connected in series with each other, means for varying the relative electromotive forces of said motors responsively to changes of current strength of said generator, and means for varying the current in said field winding in accordance with said relative electro-motive forces.

16. The combination of a generator, a regulating battery therefor, a dynamo for controlling the battery action, two motors electrically connected together and mechanically connected to said dynamo, a field winding for one of said motors arranged to give a substantially constant magnetism, a field winding for the other motor responsive to current changes of the generator, and a field winding for the said dynamo connected at one end between the motors and at the other end to the battery.

17. The combination of a generator, a regulating battery therefor, a dynamo for controlling the battery action, two motors electrically connected in series with each other and mechanically connected to said dynamo, a field winding for one of said motors arranged to give a substantially constant magnetism, a field winding for the other motor responsive to current changes of the generator, and a field winding for the said dynamo connected at one end between the motors and at the other end to the battery.

In testimony whereof, I have signed my name to this specification, in the presence of two subscribing witnesses.

WILLIAM A. TURBAYNE.

Witnesses:
 HENRY C. STEPHAN,
 F. M. PATTERSON.